US012684269B2

(12) United States Patent　　(10) Patent No.: US 12,684,269 B2
Kobayashi et al.　　(45) Date of Patent: Jul. 14, 2026

(54) PHOTOELECTRIC CONVERSION APPARATUS AND DEVICE

(71) Applicant: CANON KABUSHIKI KAISHA, Tokyo (JP)

(72) Inventors: Hideo Kobayashi, Tokyo (JP); Masaki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 18/968,960

(22) Filed: Dec. 4, 2024

(65) Prior Publication Data

US 2025/0193556 A1　Jun. 12, 2025

(30) Foreign Application Priority Data

Dec. 11, 2023　(JP) ................................. 2023-208257

(51) Int. Cl.
$H04N\ 25/78$　(2023.01)
$H04N\ 25/51$　(2023.01)
$H04N\ 25/704$　(2023.01)
$H04N\ 25/77$　(2023.01)

(52) U.S. Cl.
CPC ............. H04N 25/78 (2023.01); H04N 25/51 (2023.01); H04N 25/77 (2023.01); H04N 25/704 (2023.01)

(58) Field of Classification Search
CPC ...... H04N 25/771; H04N 25/51; H04N 25/77; H04N 25/585; H04N 25/616; H04N 25/589; H04N 25/78; H04N 25/704
USPC ......................................................... 348/297
See application file for complete search history.

(56) References Cited

U.S. PATENT DOCUMENTS

| | | | | |
|---|---|---|---|---|
| 11,323,648 B2 * | 5/2022 | Matsuura | ............. | H04N 25/616 |
| 12,225,309 B2 * | 2/2025 | Itano | ....................... | H03M 3/30 |
| 12,355,406 B2 * | 7/2025 | Kobayashi | .......... | H03F 3/45197 |
| 2015/0311914 A1 * | 10/2015 | Chae | ..................... | H03M 3/486 |
| | | | | 341/143 |
| 2019/0246054 A1 | 8/2019 | Kobayashi | | |

(Continued)

FOREIGN PATENT DOCUMENTS

| | | |
|---|---|---|
| JP | 2019135815 A | 8/2019 |
| JP | 2020115603 A | 7/2020 |

(Continued)

*Primary Examiner* — Pritham D Prabhakher
(74) *Attorney, Agent, or Firm* — Canon U.S.A., Inc. IP Division

(57) ABSTRACT

A photoelectric conversion apparatus includes a pixel including a conversion unit configured to accumulate a charge based on incident light, the pixel being configured to output a photoelectric conversion signal based on the accumulated charge, a sample-and-hold unit configured to sample and hold a first photoelectric conversion signal and a second photoelectric conversion signal output from the pixel, and an oversampling conversion unit configured to analog-to-digital (AD) convert the first photoelectric conversion signal and the second photoelectric conversion signal output from the sample-and-hold unit, wherein in processing from when the first photoelectric conversion signal and the second photoelectric conversion signal are output from the pixel to when the first photoelectric conversion signal and the second photoelectric conversion signal are AD converted, a gain set for the first photoelectric conversion signal and a gain set for the second photoelectric conversion signal are different.

20 Claims, 9 Drawing Sheets

(56)        References Cited

U.S. PATENT DOCUMENTS

| | | | | |
|---|---|---|---|---|
| 2020/0265909 A1* | 8/2020 | Matsuura | ............. | H04N 25/616 |
| 2021/0281784 A1* | 9/2021 | Okada | ................. | H03M 1/1245 |
| 2022/0132055 A1 | 4/2022 | Suzuki | | |
| 2022/0303484 A1* | 9/2022 | Kobayashi | ............. | H04N 25/78 |
| 2022/0303486 A1* | 9/2022 | Kobayashi | ............. | H04N 25/78 |
| 2022/0303492 A1* | 9/2022 | Itano | ..................... | H03M 3/472 |
| 2023/0070568 A1* | 3/2023 | Kobayashi | ............. | H10F 39/18 |
| 2023/0216459 A1* | 7/2023 | Kobayashi | ............. | H03M 3/456 |
| | | | | 348/300 |
| 2023/0247322 A1* | 8/2023 | Itano | ....................... | H03M 3/30 |
| | | | | 348/207.99 |
| 2023/0282654 A1* | 9/2023 | Kobayashi | ......... | H10F 39/8063 |
| | | | | 257/414 |

FOREIGN PATENT DOCUMENTS

| | | | |
|---|---|---|---|
| JP | 2022069132 A | 5/2022 |
| JP | 2022144243 A | 10/2022 |
| JP | 2023001516 A | 1/2023 |
| JP | 2023127108 A | 9/2023 |
| WO | 2019069614 A1 | 4/2019 |

* cited by examiner

PHOTOELECTRIC CONVERSION APPARATUS AND DEVICE

BACKGROUND

Technical Field

The aspect of the embodiments relates to a photoelectric conversion apparatus and a device.

Description of the Related Art

Some solid-state image sensors include $\Delta\Sigma$ analog-to-digital (AD) conversion circuits, which are a type of oversampling AD conversion circuits. WO 2019/069614 discusses a solid-state image sensor that realizes a wide input voltage range by two capacitive elements for storing signals from a pixel and outputting a weighted average of the voltages stored in the two capacitive elements.

However, there has been room for improvement in optimizing the AD conversion operation of photoelectric conversion apparatuses equipped with oversampling AD conversion circuits, including $\Delta\Sigma$ AD conversion circuits, such as discussed in WO 2019/069614.

SUMMARY

According to an aspect of the embodiments, a photoelectric conversion apparatus includes a pixel including a photoelectric conversion unit configured to accumulate a charge based on incident light, the pixel being configured to output a photoelectric conversion signal based on the accumulated charge, a sample-and-hold unit configured to sample and hold a first photoelectric conversion signal and a second photoelectric conversion signal output from the pixel, and an oversampling conversion unit configured to analog-to-digital (AD) convert the first photoelectric conversion signal and the second photoelectric conversion signal output from the sample-and-hold unit, wherein in processing from when the first photoelectric conversion signal and the second photoelectric conversion signal are output from the pixel to when the first photoelectric conversion signal and the second photoelectric conversion signal are AD converted, a gain set for the first photoelectric conversion signal and a gain set for the second photoelectric conversion signal are different.

Further features of the disclosure will become apparent from the following description of exemplary embodiments with reference to the attached drawings.

DESCRIPTION OF THE EMBODIMENTS

Figure 1:
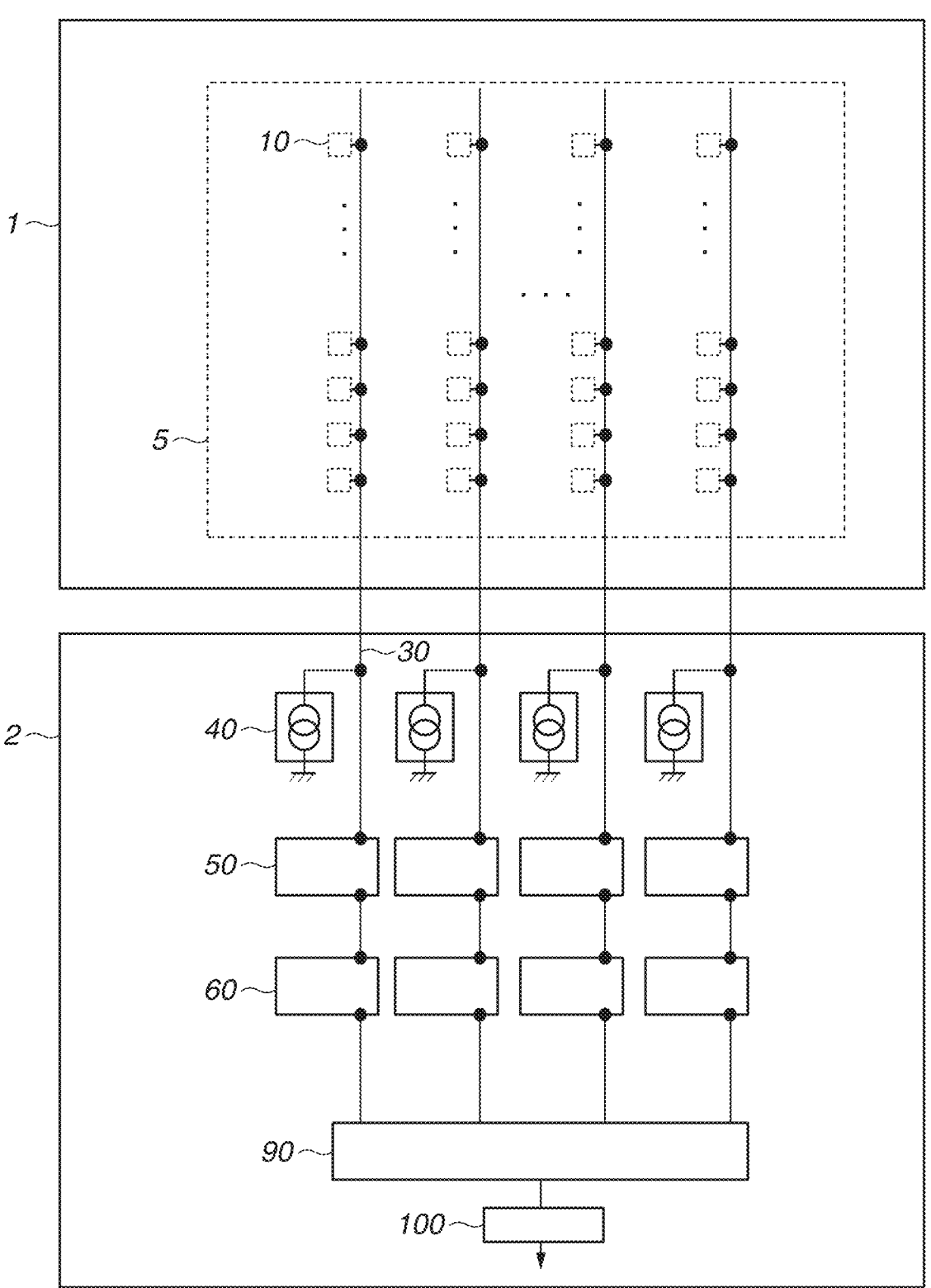
FIG. 1 is a block diagram for describing a photoelectric conversion apparatus according to a first exemplary embodiment.

Hereinafter, exemplary embodiments will be described with reference to the drawings, but the exemplary embodiments described below do not limit the scope of the disclosure according to the appended claims. Although a plurality of features is described in the exemplary embodiments, all of the plurality of features are not necessarily essential to the disclosure, and the plurality of features may be arbitrarily combined. In the accompanying drawings, similar components are denoted by the same reference numerals, and the repetitive description will be omitted. In each of the exemplary embodiments described below, a sensor for imaging will be mainly described as an example of a photoelectric conversion apparatus. However, each exemplary embodiment is not limited to a sensor for imaging, and can be applied to other examples of the photoelectric conversion device. Such an example includes the imaging apparatus, the distance measuring apparatus (an apparatus for measuring a distance using focus detection or time of flight (TOF)), the photometric apparatus (an apparatus for measuring an amount of incident light).

In the present specification, terms indicating specific directions and positions (for example, "upper", "lower", "right", "left", and other terms including these terms) are used as necessary. The use of these terms is for facilitating understanding of the exemplary embodiments with reference to the drawings, and the technical scope of the disclosure is not limited by the meanings of these terms.

In this specification, the description "a member A and a member B are electrically connected" is not limited to the case where the member A and the member B are directly connected. For example, even if another member C is connected between the member A and the member B, it is sufficient as a description that they are electrically connected.

A photoelectric conversion apparatus according to a first exemplary embodiment of the disclosure will be described with reference to FIGS. 1 to 4.

FIG. 1 is an example of a block diagram illustrating the photoelectric conversion apparatus according to the present exemplary embodiment.

The photoelectric conversion apparatus includes a pixel substrate 1 and a circuit substrate 2 on which circuits are mounted. A pixel unit 5 is disposed on the pixel substrate 1. The pixel unit 5 includes a plurality of pixels 10 arranged in a matrix, each including a photoelectric conversion unit for generating a charge based on incident light. The outputs from the plurality of pixels 10 are output to the circuit substrate 2 via vertical signal lines 30. The circuit substrate 2 may be stacked on the pixel substrate 1, or the foregoing components on the pixel substrate 1 and the circuit substrate 2 may be disposed on the same substrate. As employed herein, a column direction refers to a vertical direction in FIG. 1, or equivalently, a vertical direction in which the vertical signal lines 30 extend from the pixel substrate 1 to the circuit substrate 2. A row direction refers to a horizontal direction in FIG. 1, i.e., a direction orthogonal to the vertical signal lines 30.

Current sources 40, sample-and-hold units 50, conversion units 60, a data processing unit 90, and an output unit 100 are disposed on the circuit substrate 2. The current sources 40 are located to correspond to the respective vertical signal lines 30. The current sources 40 supply bias currents through the vertical signal lines 30 to pixels 10 selected to read pixel signals from. The vertical signal lines 30 transfer the pixel signals based on the charges generated by the photoelectric conversion units of the pixels 10 from the pixels 10 to the sample-and-hold units 50.

The sample-and-hold units 50 sample the pixel signals generated by the respective pixels 10 from the pixel unit 5 via the vertical signal lines 30, and hold the pixel signals. In the present exemplary embodiment, the sample-and-hold units 50 each include two sample-and-hold circuits. A first sample-and-hold circuit samples and holds a pixel signal corresponding to a reset level when a photoelectric conversion unit is reset (hereinafter, a reset-level signal). A second sample-and-hold circuit samples and holds a pixel signal corresponding to an imaging signal obtained when the photoelectric conversion unit performs a photoelectric conversion operation (hereinafter, a photoelectric conversion signal). The first sample-and-hold circuit and the second sample-and-hold circuit are provided for each of the vertical signal lines 30.

The plurality of conversion units 60 each includes an analog-to-digital (AD) conversion circuit that AD-converts the pixel signals output from the corresponding sample-and-hold unit 50. Each of the plurality of conversion units 60 is connected to a corresponding one of the plurality of vertical signal lines 30. Examples of the AD conversion circuits may include, but not limited to, slope AD conversion circuits, successive approximation AD conversion circuits, and $\Delta\Sigma$ AD conversion circuits. In the present exemplary embodiment, a configuration using oversampling AD conversion circuits will be described.

The data processing unit 90 processes digital signals output from the conversion units 60. The data processing unit 90 also performs digital processing such as correction processing and interpolation processing on the digital signals output from the conversion units 60. The output unit 100 outputs the signals processed by the data processing unit 90 to outside.

Figure 2:
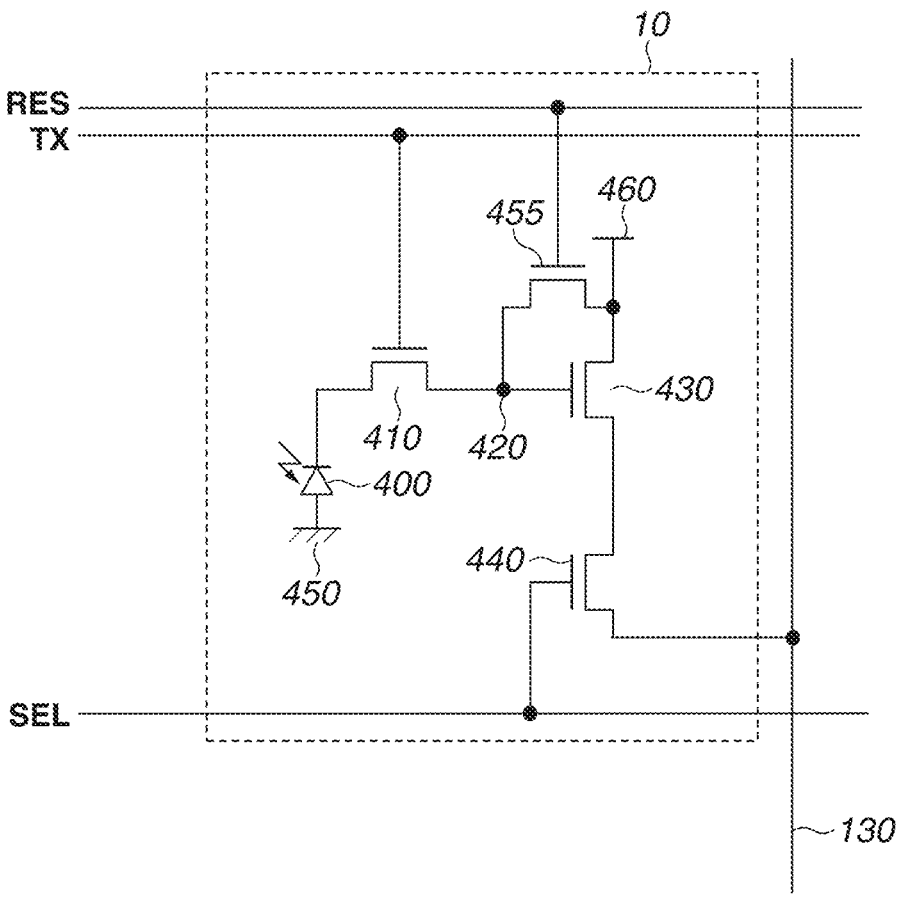
FIG. 2 is a circuit diagram for describing the photoelectric conversion apparatus according to the first exemplary embodiment.

FIG. 2 is an example of a circuit diagram of a pixel 10 included in the photoelectric conversion apparatus according to the present exemplary embodiment. The present exemplary embodiment is applicable to both front-illuminated and back-illuminated sensors.

The pixel 10 includes a photoelectric conversion unit 400, a transfer transistor 410, a reset transistor 455, an amplification transistor 430, and a selection transistor 440. An example of the photoelectric conversion unit 400 is a photodiode. One of the main electrodes of the photoelectric conversion unit 400 is connected to a reference voltage 450. The photoelectric conversion unit 400 photoelectrically converts received light into a charge (such as photoelectrons) with an amount corresponding to the amount of the received light, and accumulates the charge.

The other main electrode of the photoelectric conversion unit 400 is electrically connected to the gate electrode of the amplification transistor 430 via the transfer transistor 410. A node 420 to which the gate electrode of the amplification transistor 430 is connected functions as a floating diffusion (FD). The FD portion functions as a charge-voltage conversion unit to which the charge generated by the photoelectric conversion unit 400 is input and that converts the input charge into a signal voltage. Hereinafter, the node 420 may be referred to as an FD portion 420.

A transfer signal TX is supplied to the gate electrode of the transfer transistor 410. The transfer transistor 410 becomes conducting in response to the transfer signal TX, whereby the charge accumulated in the photoelectric conversion unit 400 is transferred to the node 420 that is the FD portion.

The reset transistor 455 is connected between a power supply voltage 460 and the node 420. The expression that a transistor is connected between A and B means that one of the main electrodes (source and drain) of the transistor is connected to A, and the other main electrode is connected to B. The gate electrode of the transistor is not connected to A or B.

A reset signal RES is supplied to the gate electrode of the reset transistor 455. The reset transistor 455 becomes conducting in response to the reset signal RES, whereby the charge held in the FD portion 420 is swept out. The voltage of the node 420 is thereby reset to the power supply voltage 460. The pixel 10 is reset by such a reset operation.

The amplification transistor 430 is connected at the gate electrode to the node 420, at one of the main electrodes to the power supply voltage 460, and at the other main electrode to the selection transistor 440.

The gate electrode of the amplification transistor 430 serves as an input of a source follower circuit for reading the signal obtained by the photoelectric conversion of the photoelectric conversion unit 400. The other main electrode of the amplification transistor 430 is connected to a vertical signal line 30 via the selection transistor 440. The amplification transistor 430 and the current source 40 connected to the vertical signal line 30 constitute a source follower that converts the voltage of the node 420 into the voltage of the vertical signal line 30.

The selection transistor 440 is connected between the amplification transistor 430 and the vertical signal line 30. A selection signal SEL is supplied to the gate electrode of the selection transistor 440. The selection transistor 440 becomes conducting in response to the selection signal SEL, whereby the pixel 10 is brought into a selected state. In the selected state, the signal based on the voltage of the node 420 is output to the vertical signal line 30 via the amplification transistor 430 as a pixel signal.

The circuit configuration of the pixel 10 is not limited to the configuration illustrated in FIG. 2. For example, the selection transistor 440 may be connected between the power supply voltage 460 and the amplification transistor 430. In a case where more than one vertical signal line 30 is included in a single pixel column, each pixel 10 may include a plurality of selection transistors 440 connected to respective different vertical lines 30. In the configuration illustrated in FIG. 2, the pixel 10 has a 4-transistor (4Tr.) configuration including the transfer transistor 410, the reset transistor 455, the amplification transistor 430, and the selection transistor 440. However, this is not restrictive. For example, the pixel 10 may have a 3Tr. configuration, where the selection transistor 440 is omitted and the voltage of the node 420 is controlled to operate the amplification transistor 430 as a selection transistor as well. The number of transistors may be increased to constitute a 5Tr. or higher-order configuration.

When the pixel 10 is given the reset signal RES, the reset transistor 455 resets the voltage of the node 420. With the pixel 10 reset, the pixel 10 outputs the reset-level signal corresponding to the reset level when the photoelectric conversion unit 400 is reset. This leads to outputting of a photoelectric conversion signal corresponding to an imaging signal generated through photoelectric conversion based on the light incident on the photoelectric conversion unit 400.

Figure 3:
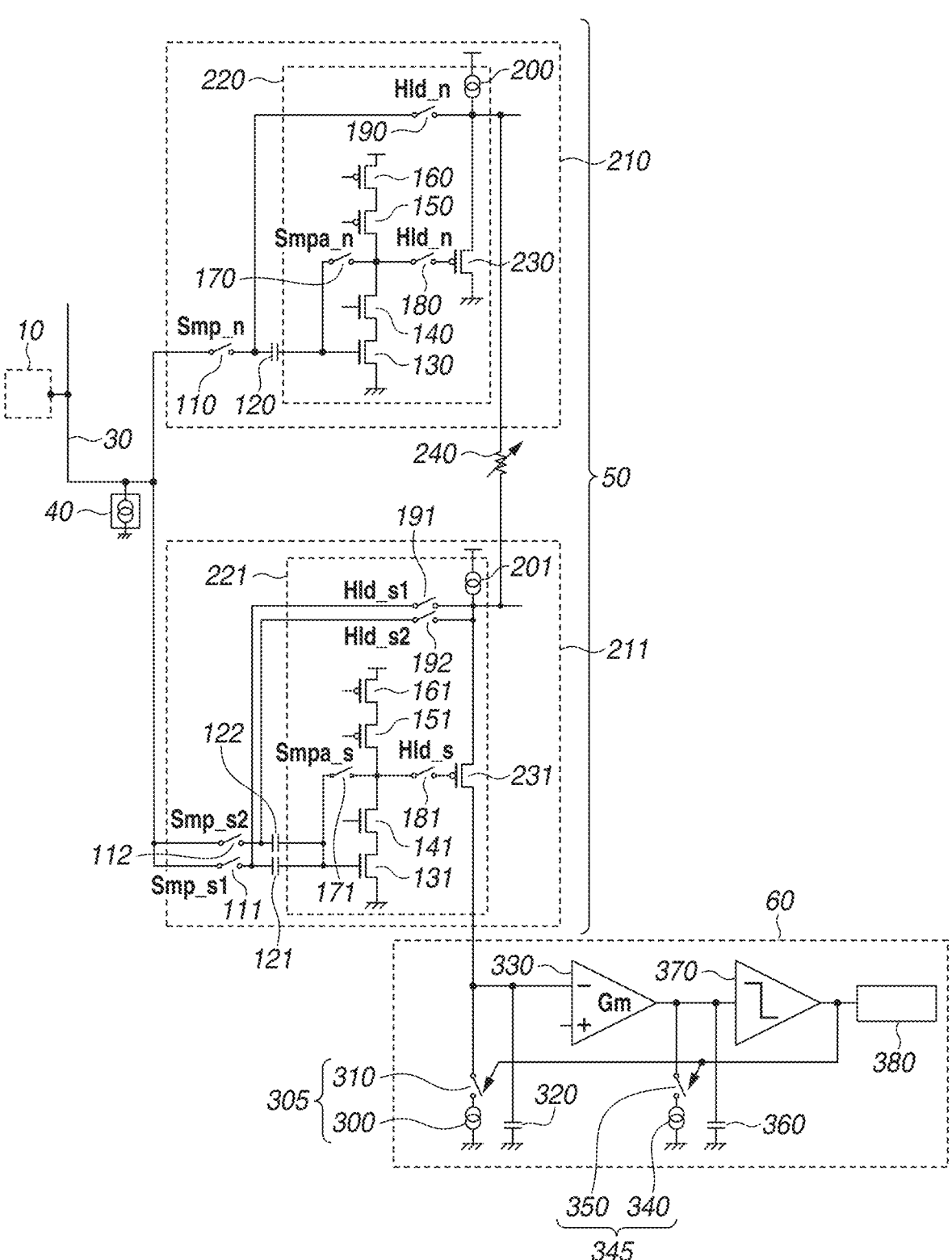
FIG. 3 is a circuit diagram for describing the photoelectric conversion apparatus according to the first exemplary embodiment.

FIG. 3 is an example of a circuit diagram of a sample-and-hold unit 50 and a conversion unit 60 included in the photoelectric conversion apparatus according to the present exemplary embodiment. FIG. 3 illustrates the sample-and-hold unit 50 and the conversion unit 60 disposed to correspond to a vertical signal line 30. In the present exemplary embodiment, one sample-and-hold unit 50 and one conversion unit 60 are provided for each vertical signal line 30.

The sample-and-hold unit 50 includes a first sample-and-hold circuit 210 and a second sample-and-hold circuit 211. As will be described below, the first sample-and-hold circuit 210 samples and holds the reset-level signal output from a pixel 10 when its photoelectric conversion unit 400 is reset. The second sample-and-hold circuit 211 samples and holds the photoelectric conversion signal generated based on the light incident on the photoelectric conversion unit 400.

The first sample-and-hold circuit 210 includes a capacitive element 120 and an inverting amplifier 220.

A switch 110 controls connection between the vertical signal line 30 and the capacitive element 120 based on a control signal Smp_n. Examples of the inverting amplifier 220 include a combination of a common source circuit and a source follower circuit. The inverting amplifier 220 includes transistors 130, 140, 150, 160, and 230, switches 170, 180, and 190, and a current source 200. The switch 170 is connected between the input and output of the common source circuit, which includes the transistors 130, 140, 150, and 160, and controlled by a control signal Smpa_n. The reset-level signal is output via the inverting amplifier 220 in response to a control signal Hld_n.

The second sample-and-hold circuit 211 may have a configuration similar to that of the first sample-and-hold circuit 210, but differs from the first sample-and-hold circuit 210 mainly in that switches 112 and 192 and a capacitive element 122 are added. The second sample-and-hold circuit 211 includes capacitive elements 121 and 122 for holding the pixel signal from the vertical signal line 30, and an inverting amplifier 221. Switches 111 and 112 control connection of the vertical signal line 30 with the capacitive elements 121 and 122 based on control signals Smp_s1 and Smp_s2, respectively.

Like the inverting amplifier 220, examples of the inverting amplifier 221 include a combination of a common source circuit and a source follower circuit. The inverting amplifier 221 includes transistors 131, 141, 151, 161, and 231, switches 171, 181, 191, and 192, and a current source 201. The switch 171 is connected between the input and output of the common source circuit, which includes the transistors 131, 141, 151, and 161, and controlled by a control signal Smpa_s. The photoelectric conversion signal is output via the inverting amplifier 221 in response to a control signal Hld_s1 or Hld_s2.

A resistive element 240 is electrically connected between the output node of the first sample-and-hold circuit 210 and the output node of the second sample-and-hold circuit 211.

A description is given of the case where the first sample-and-hold circuit 210 outputs the reset-level signal and the second sample-and-hold circuit 211 outputs the photoelectric conversion signal. A current I flowing through the resistive element 240 is expressed by the following (Eq. 1):

$$I = (Vn - Vs)/R, \qquad \text{(Eq. 1)}$$

where voltage at the output node of the first sample-and-hold circuit 210, i.e., the voltage of the reset-level signal is Vn, the voltage at the output node of the second sample-and-hold circuit 211, i.e., the voltage of the photoelectric conversion signal is Vs, and the resistance of the resistive element 240 is R.

This current I is input to the conversion unit 60. As expressed by (Eq. 1), the current I flowing through the resistive element 240 here is proportional to the difference between the voltage Vn of the reset-level signal and the voltage Vs of the photoelectric conversion signal. This means that correlated double sampling (CDS) is performed in the phase where the current I is input to the conversion unit 60.

The conversion unit 60 is an oversampling AD conversion circuit, e.g., a $\Delta\Sigma$ AD conversion circuit. The $\Delta\Sigma$ AD conversion circuit includes a first integrator, a second integrator, a quantizer 370, and a decimation filter 380. In the conversion unit 60, the first integrator includes an integration capacitor 320. The second integrator includes a voltage-current conversion circuit (Gm cell) 330 that converts voltage into current, and an integration capacitor 360. An AD converter 305 including a current source 300 and a switch 310 is connected to the input node of the first integrator.

The AD converter 305 controls the current to the first integrator based on a digital signal via the second integrator and the quantizer 370. An AD converter 345 including a current source 340 and a switch 350 is connected to the input node of the second integrator. The AD converter 345 controls the current to the second integrator based on the output of the second integrator, quantized by the quantizer 370.

In the conversion unit 60, the quantizer 370 feeds back the previous quantization value to the second integrator and the first integrator through the AD converters 305 and 345. Feeding back the previous quantization value to the AD converters 305 and 345 in such a manner while the previous quantization value is passed through the integrators twice results in obtaining of a second-order noise shaping characteristic. Moreover, the decimation filter 380 located at the subsequent stage of the quantizer 370 removes high-frequency noise, whereby an accurate AD conversion output is obtained.

Figure 4:
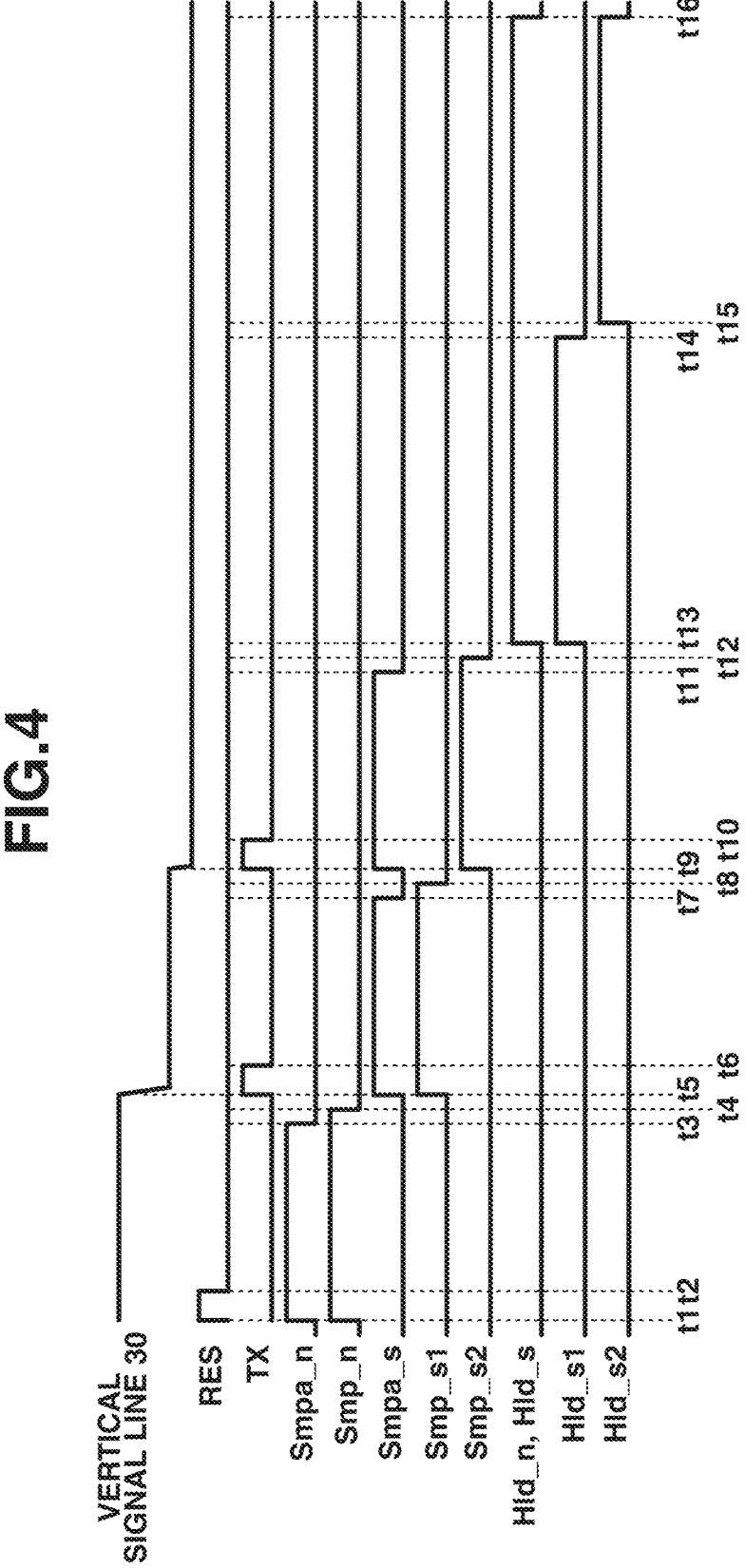
FIG. 4 is a driving timing chart for describing the photoelectric conversion apparatus according to the first exemplary embodiment.

FIG. 4 is an example of a driving timing chart illustrating the operation timing of the sample-and-hold unit 50 and the conversion unit 60 included in the photoelectric conversion apparatus according to the present exemplary embodiment. The horizontal axis of FIG. 4 indicates time, and the vertical axis indicates voltage. The control signal RES is a signal for resetting the pixel 10. The transfer signal TX controls signal reading from the photoelectric conversion unit 400. The control signals Smpa_n, Smp_n, Smpa_s, Smp_s1, Smp_s2, Hld_n, Hld_s, Hld_s1, and Hld_s2 control the switches in the first and second sample-and-hold circuits 210 and 211. In the following description, the switches will be described to be on while the waveforms of the corresponding signals in FIG. 4 are at a high level (for example, see the state of the waveform of the control signal RES between times t1 and t2), and off while the corresponding control signals are at a low level. That a switch is on refers to a state where the input node and output node of the switch are conducting. On the other hand, that a switch is off refers to a state where the input node and output node of the switch are not conducting.

At times t1 to t2, the control signal RES of FIG. 2 becomes high and the reset transistor 455 turns on, whereby the FD portion 420 is reset. The control signal SEL illustrated in FIG. 2 is also controlled, whereby the voltage of the vertical signal line 30 is set to the reset-level voltage Vn. At time t1, the control signals Smp_n and Smpa_n become high and the switches 110 and 170 of the first sample-and-hold circuit 210 turn on. Next, at time t3 when the control signal Smpa_n transitions from high to low, the reset-level voltage Vn is sampled and accumulated in the capacitive element 120. At time t4, the control signal Smp_n transitions from high to low and the switch 110 turns off, whereby the capacitive element 120 is disconnected from the vertical signal line 30.

At times t5 to t6, the control signal TX of FIG. 2 becomes high and the transfer transistor 410 turns on. In the meantime, the charge generated in the photoelectric conversion unit 400 by the light incident between times t2 and t6 is transferred to the FD portion 420. In other words, the period between time t2 and time t6 is an exposure period. The voltage of the FD portion 420 drops based on the amount of charge. The voltage of the FD portion 420 is output to the vertical signal line 30 via the amplification transistor 430 in response to the control signal SEL.

The voltage of the vertical signal line 30 is thereby set to a voltage Vs1 of the first photoelectric conversion signal. At time t5, the control signals Smp_s and Smpa_s1 become high, and the switches 111 and 171 in the second sample-and-hold circuit 211 for the photoelectric conversion signal turn on.

Next, at time t7 when the control signal Smpa_s transitions from high to low, the switch 171 turns off and the voltage Vs1 of the first photoelectric conversion signal is sampled and accumulated in the capacitive element 121. At time t8, the control signal Smp_s1 transitions from high to low and the switch 111 turns off, whereby the capacitive element 121 is disconnected from the vertical signal line 30.

When the switch 171 turns off at time t7, the voltage across the switch 171 remains substantially the same regardless of the voltage of the vertical signal line 30. The turning off of the switch 171 therefore does not cause any charge injection, and there occurs no error voltage to the voltage Vs1 of the first photoelectric conversion signal accumulated in the capacitive element 121. When the switch 111 turns off at time t8, the capacitive element 121 is in a high impedance state at both ends. The turning off of the switch 111 therefore does not have any impact. In such a manner, the occurrence of an error voltage to the voltage Vs1 of the first photoelectric conversion signal is prevented.

At times t9 to t10, the control signal TX of FIG. 2 becomes high and the transfer transistor 410 turns on again. In the meantime, the charge generated in the photoelectric conversion unit 400 by the light incident between times t6 and t10 is additionally transferred to the FD portion 420. In other words, the period from times t6 to t10 serves as an exposure period in addition to the period from times t2 to t6. The voltage of the FD unit 420 drops further based on the amount of charge. As a result, the voltage of the vertical signal line 30 drops to a voltage Vs2 of the second photoelectric conversion signal. At time t9, the control signals Smp_s and Smpa_s2 become high, and the switches 112 and 171 in the second sample-and-hold circuit 211 for the photoelectric conversion signal turn on.

Next, at time t11 when the control signal Smpa_s transitions from high to low, the voltage Vs2 of the second photoelectric conversion signal is sampled and accumulated in the capacitive element 122. At time t12, the control signal Smp_s2 transitions from high to low and the switch 112 turns off, whereby the capacitive element 122 is disconnected from the vertical signal line 30.

When the switch 171 turns off at time t11, the voltage across the switch 171 remains substantially the same regardless of the voltage of the vertical signal line 30. The turning off of the switch 171 therefore does not cause any charge injection, and there occurs no error voltage to the voltage Vs2 of the second photoelectric conversion signal accumulated in the capacitive element 122. Moreover, when the switch 112 turns off at time t12, the capacitive element 122 is in a high impedance state at both ends. The turning off of the switch 112 therefore does not have any impact. In such a manner, the occurrence of an error voltage to the voltage Vs2 of the second photoelectric conversion signal is prevented.

At time t13, the control signal Hld_n becomes high and the switches 180 and 190 turn on, whereby the capacitive element 120 in the first sample-and-hold circuit 210 outputs the voltage Vn of the reset-level signal. At time t13, the control signals Hld_s1 and Hld_s become high and the switches 181 and 191 turn on as well, whereby the capacitive element 121 in the second sample-and-hold circuit 211 outputs the voltage Vs1 of the first photoelectric conversion signal.

As described above, the input current to the conversion unit 60 is a current based on the difference between the voltage Vn of the reset-level signal at the output node of the first sample-and-hold circuit 210 and the voltage Vs1 of the first photoelectric conversion signal at the output node of the second sample-and-hold circuit 211. The conversion unit 60 AD-converts the current based on the difference between the voltages Vn and Vs1.

At time t14, the control signal Hld_s1 becomes low and the switch 191 turns off. Then, at time t15, the control signal Hld_s2 becomes high and the switch 192 turns on, whereby the capacitive element 122 in the second sample-and-hold circuit 211 outputs the voltage Vs2 of the second photoelectric conversion signal.

As described above, the input current to the conversion unit 60 is a current based on the difference between the voltage Vn of the reset-level signal at the output node of the first sample-and-hold circuit 210 and the voltage Vs2 of the second photoelectric conversion signal at the output node of the second sample-and-hold circuit 211. The conversion unit 60 AD-converts the current based on the difference between the voltages Vn and Vs2.

At time t16, the control signal Hld_n becomes low and the switches 180 and 190 turn off. At time t16, the control signal Hld_s also becomes low and the switch 181 turns off. At time t16, the control signal Hld_s2 also becomes low and the switch 192 turns off.

Since the first photoelectric conversion signal and the second photoelectric conversion signal are pixel signals corresponding to the accumulation times of different lengths, the signals are less likely to have the same output amplitude except in an unexposed dark state. The exposure period (t2 to t10) for accumulating the charge corresponding to the second photoelectric conversion signal is longer than the exposure period (t2 to t6) for accumulating the charge corresponding to the first photoelectric conversion signal. In a case where the amount of light incident on the photoelectric conversion unit 400 does not change much, the voltage Vs2 therefore provides a signal of larger output amplitude than the voltage Vs1. In other words, the first and second photoelectric conversion signals have different ranges of output amplitudes. As described above, in the present exemplary embodiment, a plurality of photoelectric conversion signals (first and second photoelectric conversion signals) with different lengths of charge accumulation times is read, whereby a high dynamic range signal is obtained. Consequently, using the high dynamic range signals leads to generation of high dynamic range (HDR) images and HDR moving images. As employed herein, the output amplitude refers to a voltage difference from a reference voltage, with the voltage of the signal output from the pixel 10 when the FD portion 420 is reset as the reference voltage. The same holds for output amplitudes to be described below, i.e., the reference voltage can be used as the signal output from the pixel 10 when the FD portion 420 is reset unless otherwise specified. This signal level is typically near the voltage of the power supply voltage 460.

As described above, in the present exemplary embodiment, the occurrence of error voltages to the first and second photoelectric conversion signals is prevented. This prevents degradation in the quality of HDR signals.

As a result, degradation in the image quality of HDR images and HDR moving images generated using the HDR signals are prevented.

The resistive element 240 electrically connected between the output node of the first sample-and-hold circuit 210 and the output node of the second sample-and-hold circuit 211 may be a variable resistance circuit. In other words, the output amplitude levels of the signals input to the conversion unit 60 may be adjustable depending on the resistance value. In such a case, the resistive element 240 functions as a gain setting unit. The resistance of the resistive element 240 is changed between times t13 to t14 when the capacitive element 121 reads the voltage Vs1 of the first photoelectric conversion signal and times t15 and t16 when the capacitive element 122 reads the voltage Vs2 of the second photoelectric conversion signal. Changing the resistance to change the set gain leads to a reduction in noise or power consumption in accordance with the output amplitude level. A description thereof will now be given.

In a case where the resistance at times t13 to t14 is set relatively lower than the resistance at times t15 to t16, a reduction in thermal noise occurring from the resistive element 240 leads to a reduction in the noise in the voltage Vs1 of the first photoelectric conversion signal. On the other hand, in a case where the resistance at times t13 to t14 is set relatively higher than the resistance at times t15 to t16, a reduction in the output current to the conversion unit 60 leads to a reduction in power consumption. The foregoing effect is obtainable by the configuration in which the gain set for the first photoelectric conversion signal is higher than the gain set for the second photoelectric conversion signal.

In the present exemplary embodiment, the gain set for the first photoelectric conversion signal and the gain set for the second photoelectric conversion signal are set different from each other during the processing from the generation to the AD conversion of the first and second photoelectric conversion signals. In other words, the plurality of photoelectric conversion signals is read with respective different gains. Moreover, in the operation, noise or power consumption is reduced. A configuration that changes the gain by other than making the resistance of the resistive element 240 variable may be employed. For example, the gain may be changed by making the value of the current output from the current source 300 variable. Note that in the case of switching the value of the current output from the current source 300, it takes a certain amount of time for the current value to settle down after the current value is switched. Switching the resistance of the resistive element 240 thus leads to faster signal processing compared to switching the value of the current output from the current source 300.

In the present exemplary embodiment, the capacitive elements 121 and 122 share the second sample-and-hold circuit 211, which realizes reading of the first and second photoelectric conversion signals without increase in the operating power.

In the present exemplary embodiment, the first and second photoelectric conversion signals are read using the common resistive element 240. Level fluctuations due to temperature and process variations are therefore likely to behave similarly. This prevents the superposition of different variations on the first and second photoelectric conversion signals, whereby degradation in the quality of HDR signals is prevented. As a result, degradation in the image quality of HDR images and HDR moving images generated using the HDR signals are prevented.

In the present exemplary embodiment, the resistive element 240 that sets the gain in reading the first and second photoelectric conversion signals is located at the subsequent stage of the first and second sample-and-hold circuits 210 and 211. Such a configuration leads to accurate CDS even in the case where the resistance of the resistive element 240 in reading each of the first and second photoelectric conversion signals is set to be variable. A description thereof will now be given.

Figure 5:
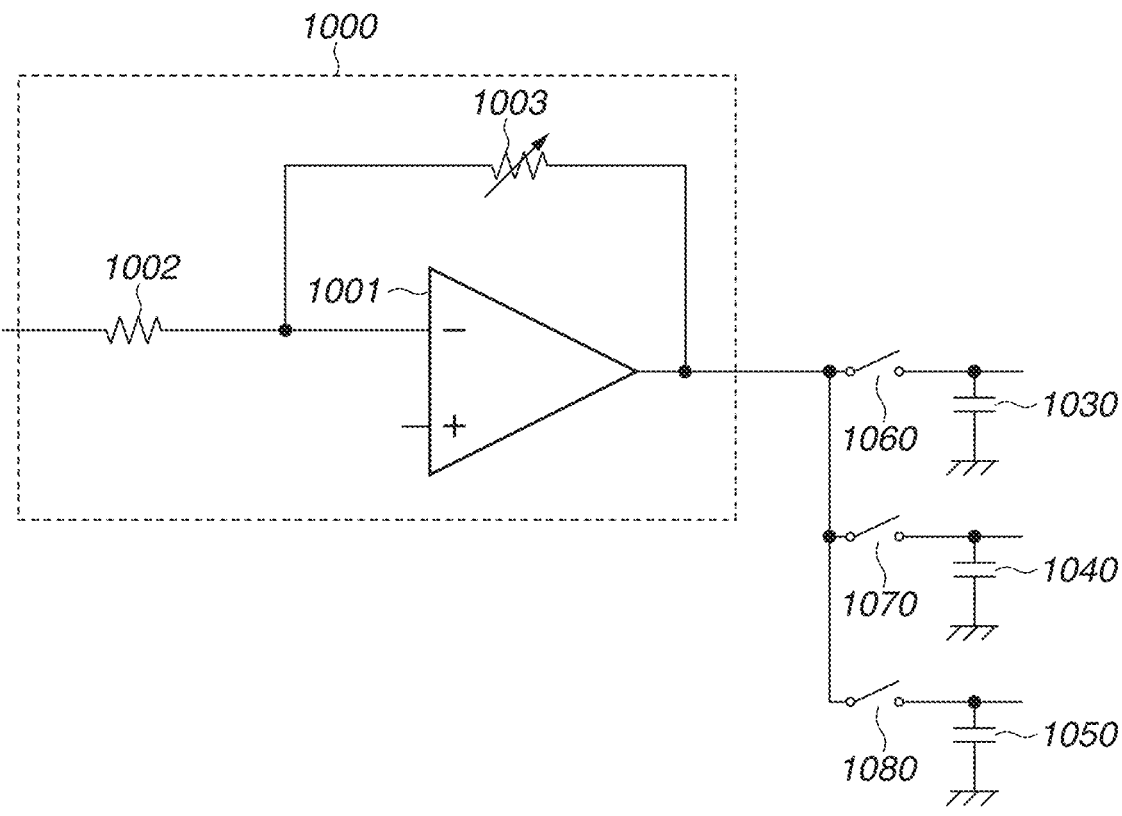
FIG. 5 is a circuit diagram for describing a reference photoelectric conversion apparatus.

FIG. 5 illustrates a reference example. The photoelectric conversion apparatus illustrated in FIG. 5 includes a gain setting circuit 1000, a capacitive element 1030 for accumulating the reset-level signal, a capacitive element 1040 for accumulating the first photoelectric conversion signal, and a capacitive element 1050 for accumulating the second photoelectric conversion signal. The gain setting circuit 1000 includes an operational amplifier 1001, a resistive element 1002, and a variable resistive element 1003. A switch 1060 is electrically connected between the gain setting circuit 1000 and the capacitive element 1030. With the switch 1060 on, the signal output from the gain setting circuit 1000 is input to the capacitive element 1030 via the switch 1060. A switch 1070 is electrically connected between the gain setting circuit 1000 and the capacitive element 1040. With the switch 1070 on, the signal output from the gain setting circuit 1000 is input to the capacitive element 1040 via the switch 1070. A switch 1080 is electrically connected between the gain setting circuit 1000 and the capacitive element 1050. With the switch 1080 on, the signal output from the gain setting circuit 1000 is input to the capacitive element 1050 via the switch 1080. In other words, in the configuration of FIG. 5, the gain setting circuit 1000 is located at the preceding stage, not the subsequent stage, of the capacitive elements 1030, 1040, and 1050. The capacitive elements 1030, 1040, and 1050 correspond to the capacitive elements 120, 121, and 122 illustrated in FIG. 3, respectively. The switches 1060, 1070, and 1080 correspond to the switches 110, 111, and 112 illustrated in FIG. 3, respectively.

In the configuration illustrated in FIG. 5, a description is given of a case in which the first and second photoelectric conversion signals read with different gains are both subjected to CDS using a common reset-level signal. In such a case, since the gain setting circuit 1000 is located at the preceding stage of the capacitive element 1030, the gain setting circuit 1000 is unable to change the gain for the reset-level signal accumulated in the capacitive element 1030. The gain for at least one of the first and second photoelectric conversion signals and the gain for the reset-level signal are therefore different. This lowers the accuracy of the CDS using at least one of the first and second photoelectric conversion signals that corresponds to the gain different from the gain for the reset-level signal. For example, in a case where the reset-level signal and the first photoelectric conversion signal are read with a first gain and the second photoelectric conversion signal is read with a second gain, the accuracy of the CDS on the second photoelectric conversion signal decreases. The reason is that different gains are applied to the offset component of the operational amplifier 1001 and the pixel signal when the reset-level signal is read and when the second photoelectric conversion signal is read.

In the configuration illustrated in FIG. 3, a description is given of a case in which the first and second photoelectric conversion signals read with different gains are both subjected to CDS using the common reset-level signal. In such a case, since the resistive element 240 is located at the subsequent stage of the first and second sample-and-hold circuits 210 and 211, the resistive element 240 can change the gain for the reset-level signal accumulated in the capacitive element 120. Even in a case where the gains for the first and second photoelectric conversion signals are set to be different, the gain for the reset-level signal is thus set to the substantially same gains as the respective gains for the first and second photoelectric conversion signals. This leads to accurate CDS using the first and second photoelectric conversion signals even in a case where the first and second photoelectric conversion signals read with different gains are subjected to the CDS using the common reset-level signal.

A photoelectric conversion apparatus according to a modification of the first exemplary embodiment of the disclosure will be described with reference to FIG. 6. Components similar to those of the first exemplary embodiment are denoted by the same reference numerals. A description of such components may be omitted or simplified.

The modification of the first exemplary embodiment differs from the first exemplary embodiment in the configuration of the pixel circuits. FIG. 6 is an example of a circuit diagram of a pixel 10 included in the photoelectric conversion apparatus according to the modification.

Figure 6:
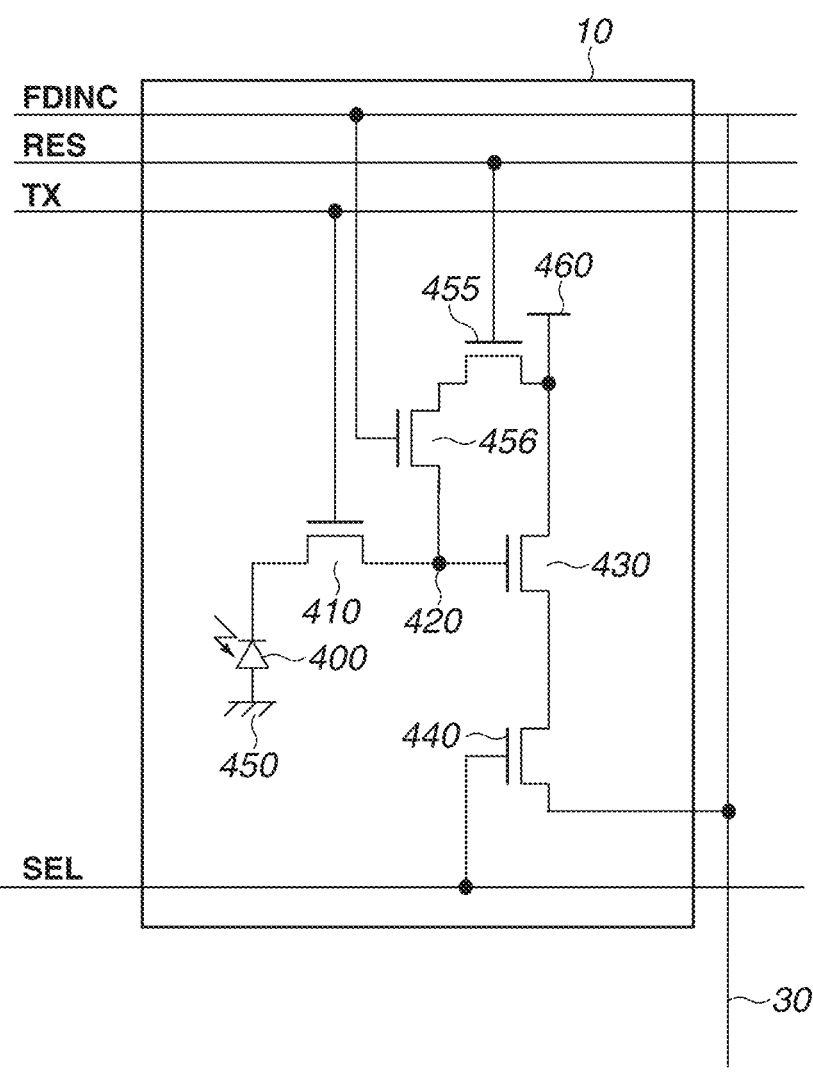
FIG. 6 is a circuit diagram for describing a photoelectric conversion apparatus according to a modification of the first exemplary embodiment.

As illustrated in FIG. 6, the pixel 10 may include a transistor 456 (FD capacitance switching transistor 456) for switching the capacitance of the FD portion 420. For example, during a reading period, the capacitance of the FD portion 420 is changed by switching the FD capacitance switching transistor 456 on or off at time t9 of FIG. 4, using a signal FDINC. Here, the FD capacitance switching transistor 456 functions as a gain changing unit (gain setting unit) that changes the capacitance of the FD portion 420. In outputting the first photoelectric conversion signal and the second photoelectric conversion signal, the FD capacitance switching transistor 456 switches the capacitance of the FD portion 420 accordingly.

The capacitance may be changed by connecting another capacitive element to the FD portion 420 via a transistor and switching the transistor on and off. The gain changing unit enables the pixel signals with different voltage conversion gains to be output to and held in the capacitive elements 121 and 122. By using the signals of different voltage gains, HDR images and HDR moving images are obtained.

An even higher gain is settable for the high-gain pixel signal output with the FD capacitance switching transistor 456 off, by further switching the resistance of the resistive element 240. In such a case, a signal of even higher dynamic range is obtained. By using such signals of even higher dynamic range, HDR images and HDR moving images are generated.

A photoelectric conversion apparatus according to a second exemplary embodiment of the disclosure will be described with reference to FIGS. 7 and 8. Components similar to those of the first exemplary embodiment are denoted by the same reference numerals. A description of such components may be omitted or simplified.

The present exemplary embodiment differs from the first exemplary embodiment in that a single pixel includes a plurality of photoelectric conversion units. FIG. 7 is an example of the circuit diagram of a pixel 10 included in the photoelectric conversion apparatus according to the present exemplary embodiment. The present exemplary embodiment is applicable to both front-illuminated and back-illuminated sensors.

Figure 7:
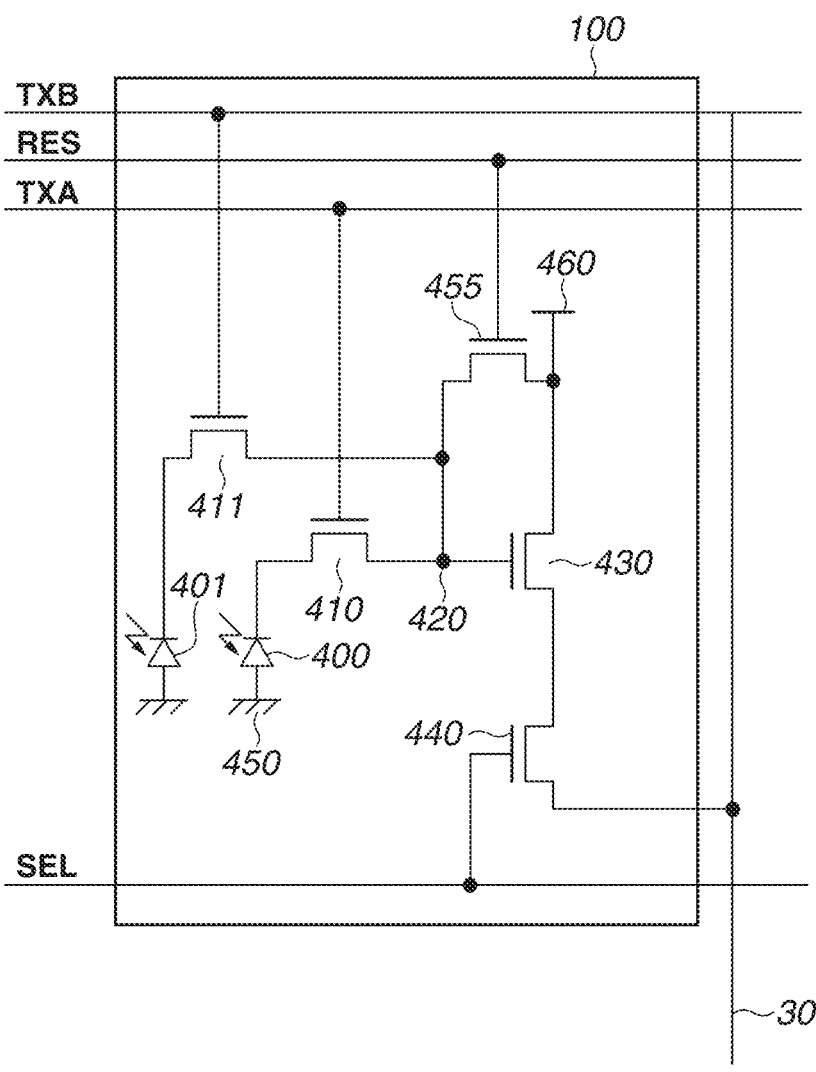
FIG. 7 is a circuit diagram for describing a photoelectric conversion apparatus according to a second exemplary embodiment.

As illustrated in FIG. 7, the pixel 10 further includes a photoelectric conversion unit 401 and a transfer transistor 411. An example of the photoelectric conversion unit 401 is a photodiode. One of the main electrodes of the photoelectric conversion unit 401 is connected to the reference voltage 450. The photoelectric conversion unit 401 photoelectrically converts received light into a charge (such as photoelectrons) with an amount corresponding to the amount of the received light, and accumulates the charge.

The other main electrode of the photoelectric conversion unit 401 is electrically connected to the gate electrode of the amplification transistor 403 via the transfer transistor 411. The node 420 to which the gate electrode of the amplification transistor 430 is electrically connected functions as an FD. The FD portion 420 functions as a charge-voltage conversion unit for converting the charges generated by the photoelectric conversion units 400 and 401 into a signal voltage. The pixel 10 is configured so that the photoelectric conversion units 400 and 401 share the FD portion 420.

Considering that each pixel includes two photoelectric conversion units arranged in a column direction and one FD portion, the pixel 10 of FIG. 7 corresponds to two pixels 10 of FIG. 2 arranged in the column direction.

A transfer signal TXA is supplied to the gate electrode of the transfer transistor 410. The transfer transistor 410 becomes conducting in response to the transfer signal TXA, whereby the charge accumulated in the photoelectric conversion unit 400 is transferred to the FD portion 420. A transfer signal TXB is supplied to the gate electrode of the transfer transistor 411. The transfer transistor 411 becomes conducting in response to the transfer signal TXB, whereby the charge accumulated in the photoelectric conversion unit 401 is transferred to the FD portion 420.

In the present exemplary embodiment, the pixel signal output from the photoelectric conversion unit 400 is held in the capacitive element 121, and the pixel signal output from the photoelectric conversion unit 401 is held in the capacitive element 122. Such a configuration leads to reading of two rows of pixel signals during a unit reading period for faster reading.

The circuit configuration of the pixel 10 is not limited to the configuration illustrated in FIG. 7. For example, the selection transistor 440 may be connected between the power supply voltage 460 and the amplification transistor 430. In a case where a single pixel column includes more than one vertical signal line 30, a single pixel 10 may include a plurality of selection transistors 440 connected to respective different vertical signal lines 30. In the configuration illustrated in FIG. 7, the pixel 10 has a 4-transistor (4Tr.) configuration including the transfer transistors 410 and 411, the reset transistor 455, the amplification transistor 430, and the selection transistor 440. However, this is not restrictive. For example, the pixel 10 may have a 3Tr. configuration, where the selection transistor 440 is omitted and the voltage of the node 420 is controlled to operate the amplification transistor 430 as a selection transistor as well. The number of transistors may be increased to constitute a 5Tr. or higher-order configuration.

Figure 8:
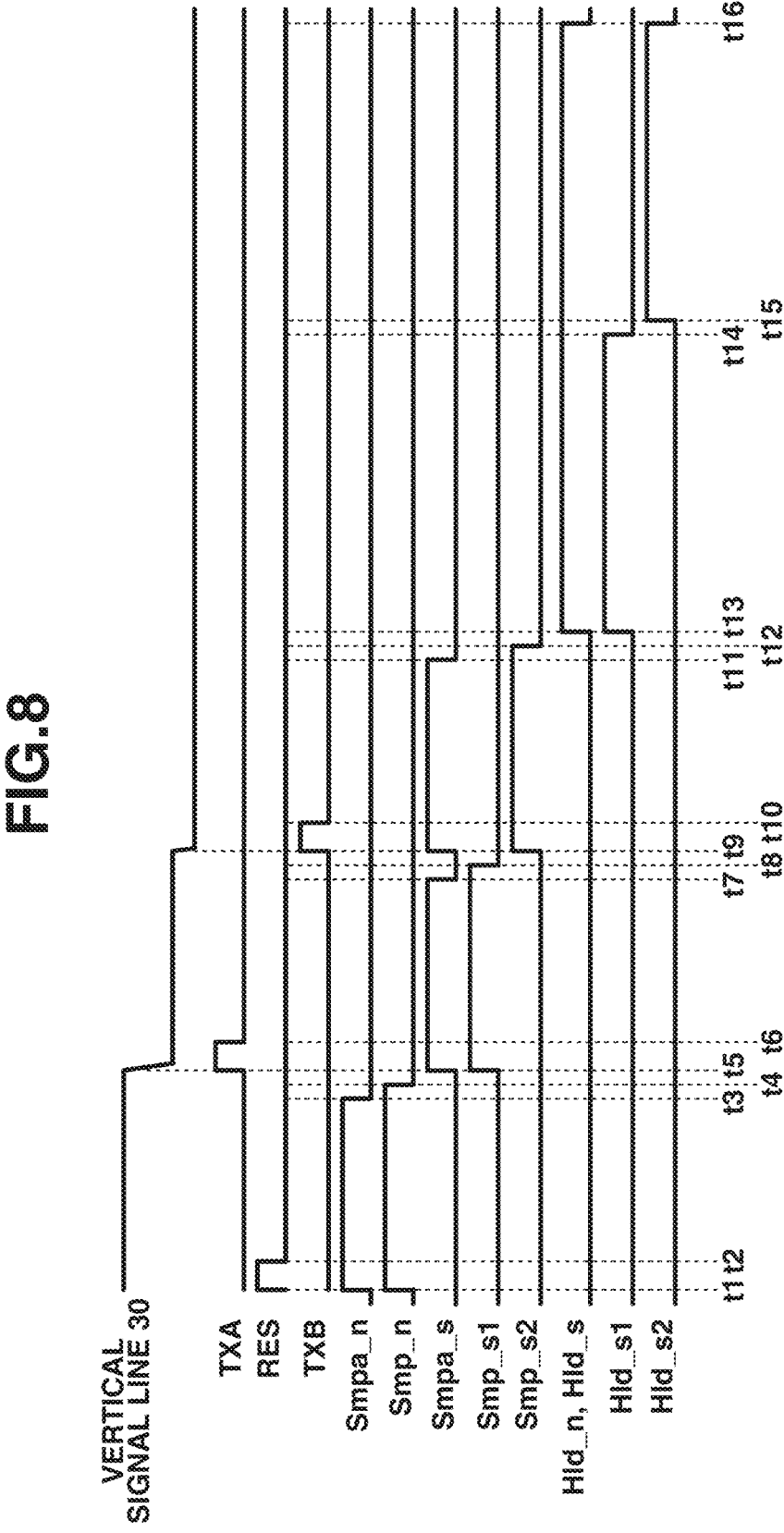
FIG. 8 is a driving timing chart for describing the photoelectric conversion apparatus according to the second exemplary embodiment.

FIG. 8 is an example of a driving timing chart illustrating the operation timing of a sample-and-hold unit 50 and a conversion unit 60 included in the photoelectric conversion apparatus according to the present exemplary embodiment. The horizontal axis of FIG. 8 indicates time, and the vertical axis indicates voltage. A control signal RES is a signal for resetting the pixel 10. The transfer signal TXA controls signal reading from the photoelectric conversion unit 400, and the transfer signal TXB controls signal reading from the photoelectric conversion unit 401. Control signals Smpa_n, Smp_n, Smpa_s, Smp_s1, Smp_s2, Hld_n, Hld_s, Hld_s1, and Hld_s2 control the switches in the first and second sample-and-hold circuits 210 and 211. In the following description, the switches will be described to be on while the waveforms of the corresponding signals in FIG. 8 are at a high level (for example, see the state of the waveform of the control signal RES between times t1 and t2), and off while the corresponding control signals are at a low level. That a switch is on refers to a state where the input node and output node of the switch are conducting. On the other hand, that a switch is off refers to a state where the input node and output node of the switch are not conducting.

At times t1 to t2, the control signal RES of FIG. 7 becomes high and the reset transistor 455 turns on, whereby the FD portion 420 is reset. The control signal SEL illustrated in FIG. 7 is also controlled, whereby the voltage of the vertical signal line 30 is set to the reset-level voltage Vn. At time t1, the control signals Smp_n and Smpa_n become high and the switches 110 and 170 of the first sample-and-hold circuit 210 turn on. Next, at time t3 when the control signal Smpa_n transitions from high to low, the reset-level voltage Vn is sampled and accumulated in the capacitive element 120. At time t4, the control signal Smp_n transitions from high to low and the switch 110 turns off, whereby the capacitive element 120 is disconnected from the vertical signal line 30.

At times t5 to t6, the control signal TXA of FIG. 7 becomes high and the transfer transistor 410 turns on. In the meantime, the charge generated in the photoelectric conversion unit 400 by the light incident between time t2 and time t6 is transferred to the FD portion 420. In other words, the period between time t2 and time t6 is an exposure period. The voltage of the FD portion 420 drops based on the amount of charge. The voltage of the FD portion 420 is output to the vertical signal line 30 via the amplification transistor 430 in response to the control signal SEL.

The voltage of the vertical signal line 30 is thereby set to the voltage Vs1 of the first photoelectric conversion signal. At time t5, the control signals Smp_s and Smpa_s1 become high, and the switches 111 and 171 in the second sample-and-hold circuit 211 for the photoelectric conversion signal turn on.

Next, at time t7 when the control signal Smpa_s transitions from high to low, the switch 171 turns off and the voltage Vs1 of the first photoelectric conversion signal is sampled and accumulated in the capacitive element 121. At time t8, the control signal Smp_s1 transitions from high to low and the switch 111 turns off, whereby the capacitive element 121 is disconnected from the vertical signal line 30.

When the switch 171 turns off at time t7, the voltage across the switch 171 remains substantially the same regardless of the voltage of the vertical signal line 30. The turning off of the switch 171 therefore does not cause any charge injection, and there occurs no error voltage to the voltage Vs1 of the first photoelectric conversion signal accumulated in the capacitive element 121. When the switch 111 turns off at time t8, the capacitive element 121 is in a high impedance state at both ends. The turning off of the switch 111 therefore does not have any impact. In such a manner, the occurrence of an error voltage to the voltage Vs1 of the first photoelectric conversion signal is prevented.

At times t9 to t10, the control signal TXB of FIG. 7 becomes high and the transfer transistor 411 turns on. In the meantime, the charge generated in the photoelectric conversion unit 401 by the light incident between times t2 and t10 is transferred to the FD portion 420. The voltage of the FD unit 420 drops further based on the amount of charge. As a result, the voltage of the vertical signal line 30 drops to the voltage Vs2 of the second photoelectric conversion signal. At time t9, the control signals Smp_s and Smpa_s2 become high, and the switches 112 and 171 in the second sample-and-hold circuit 211 for the photoelectric conversion signal turn on.

Next, at time t11 when the control signal Smpa_s transitions from high to low, the voltage Vs2 of the second photoelectric conversion signal is sampled and accumulated in the capacitive element 122. At time t12, the control signal Smp_s2 transitions from high to low and the switch 112 turns off, whereby the capacitive element 122 is disconnected from the vertical signal line 30. In short, the voltage Vs2 of the second photoelectric conversion signal based on the charges generated in the photoelectric conversion units 400 and 401 is accumulated in the capacitive element 122.

When the switch 171 turns off at time t11, the voltage across the switch 171 remains substantially the same regardless of the voltage of the vertical signal line 30. The turning off of the switch 171 therefore does not cause any charge injection, and there occurs no error voltage to the voltage Vs2 of the second photoelectric conversion signal accumulated in the capacitive element 122. Moreover, when the switch 112 turns off at time t12, the capacitive element 122 is in a high impedance state at both ends. The turning off of the switch 112 therefore does not have any impact. In such a manner, the occurrence of an error voltage to the voltage Vs2 of the second photoelectric conversion signal is prevented.

At time t13, the control signal Hld_n becomes high and the switches 180 and 190 turn on, whereby the capacitive element 120 in the first sample-and-hold circuit 210 outputs the voltage Vn of the reset-level signal. At time t13, the control signals Hld_s1 and Hld_s become high and the switches 181 and 191 turn on as well, whereby the capacitive element 121 in the second sample-and-hold circuit 211 outputs the voltage Vs1 of the first photoelectric conversion signal.

As described above, the input current to the conversion unit 60 is a current based on the difference between the voltage Vn of the reset-level signal at the output node of the first sample-and-hold circuit 210 and the voltage Vs1 of the photoelectric conversion signal at the output node of the second sample-and-hold circuit 211. The conversion unit 60 AD-converts the current based on the difference between the voltages Vn and Vs1.

At time t14, the control signal Hld_s1 becomes low and the switch 191 turns off. Then, at time t15, the control signal Hld_s2 becomes high and the switch 192 turns on, whereby the capacitive element 122 in the second sample-and-hold circuit 211 outputs the voltage Vs2 of the second photoelectric conversion signal.

As described above, the input current to the conversion unit 60 is a current based on the difference between the voltage Vn of the reset-level signal at the output node of the first sample-and-hold circuit 210 and the voltage Vs2 of the photoelectric conversion signal at the output node of the second sample-and-hold circuit 211. The conversion unit 60 AD-converts the current based on the difference between the voltages Vn and Vs2.

At time t16, the control signal Hld_n becomes low and the switches 180 and 190 turn off. At time t16, the control signal Hld_s also becomes low and the switch 181 turns off. At time 16, the control signal Hld_s2 also turns off and the switch 192 turns off.

Here, the first photoelectric conversion signal corresponds to the charge generated by the photoelectric conversion unit 400, and the second photoelectric conversion signal corresponds to the charges generated by the photoelectric conversion units 400 and 401. In other words, the first photoelectric conversion signal is output from one of the plurality of photoelectric conversion units, and the second photoelectric conversion signal is output from the plurality of photoelectric conversion units. A digital signal corresponding to the charge generated by the photoelectric conversion unit 401 is obtained at or after time t16 by determining a difference between the digital signal corresponding to the current based on the difference between the voltages Vn and Vs1 and the digital signal corresponding to the current based on the difference between the voltages Vn and Vs2. The first photoelectric conversion signal may correspond to the charge generated by the photoelectric conversion unit 400, and the second photoelectric conversion signal may correspond to the charge generated by the photoelectric conversion unit 401. In other words, the first photoelectric conversion signal may be output from one of the plurality of photoelectric conversion units, and the second photoelectric conversion signal may be output from the other of the plurality of photoelectric conversion units.

As described above, according to the present exemplary embodiment, pixel signals corresponding to two rows of pixels are read during a unit reading period for faster reading operation. The image signals that are read during a unit reading period may be ones corresponding to a plurality of rows of pixels or ones corresponding to a plurality of columns of pixels, depending on the pixel configuration.

As described above, according to the present exemplary embodiment, the occurrence of error voltages to the first and second photoelectric conversion signals is prevented, which leads to prevention of degradation in image quality.

The resistive element 240 electrically connected between the output node of the first sample-and-hold circuit 210 and the output node of the second sample-and-hold circuit 211 may be a variable resistance circuit. In other words, the output amplitude level of the signal input to the conversion unit 60 may be adjustable depending on the resistance. In such a case, the resistive element 240 functions as a gain setting unit. The resistance of the resistive element 240 is changed between times t13 to t14 when the capacitive element 121 reads the voltage Vs1 of the first photoelectric conversion signal and times t15 to t16 when the capacitive element 122 reads the voltage Vs2 of the second photoelectric conversion signal. Like the first exemplary embodiment, according to the present exemplary embodiment, the plurality of photoelectric conversion signals is read with respective different gains, and in the operation, noise or power consumption is reduced.

A configuration that changes the gain by other than making the resistance of the resistive element 240 variable may be employed. For example, the gain may be changed by making the value of the current output from the current source 300 variable. However, in the case of switching the value of the current output from the current source 300, it takes a certain amount of time for the current value to settle down after the current value is switched. Switching the resistance of the resistive element 240 thus leads to faster signal processing compared to switching the value of the current output from the current source 300.

In the present exemplary embodiment, the capacitive elements 121 and 122 share the second sample-and-hold circuit 211, which leads to reading of the first and second photoelectric conversion signals without increase in the operating power.

In the present exemplary embodiment, the first and second photoelectric conversion signals are read using the common resistive element 240. Level fluctuations due to temperature and process variations are therefore likely to behave similarly. This prevents the superposition of different variations on the first and second photoelectric conversion signals, whereby degradation in signal quality is prevented.

In the present exemplary embodiment, the resistive element 240 that sets the gain in reading the first and second photoelectric conversion signals is located at the subsequent stage of the first and second sample-and-hold circuits 210 and 211. Such a configuration leads to accurate CDS even in the case where the resistance of the resistive element 240 in reading each of the first and second photoelectric conversion signals is set to be variable.

One microlens may be provided for one pixel 10, i.e., a pair of photoelectric conversion units 400 and 401. In such a case, the photoelectric conversion units 400 and 401 may function as a pixel for phase difference detection. By functioning as a pixel for phase difference detection, the photoelectric conversion units 400 and 401 enable focus detection on an object. In such a case, the foregoing first photoelectric conversion signal serves as an autofocus (AF) signal, and the second photoelectric conversion signal serves as an imaging signal. Even when the photoelectric conversion units 400 and 401 function as a pixel for phase difference detection, the plurality of photoelectric conversion signals is read with respective different gains. For example, the AF precision is improved by setting the gain for the first photoelectric conversion signal to be relatively high. However, if the resistance of the resistive element 240 is reduced to increase the gain, the current output to the conversion unit 60 may exceed the current value of the current source 300. If the current output to the conversion unit 60 exceeds the current value of the current source 300, the current output to the conversion unit 60 may exceed the range of current values capable of AD conversion. The range of output amplitude of the second photoelectric conversion signal resulting from two photoelectric conversion units is typically greater than that of output amplitude of the first photoelectric conversion signal resulting from one photoelectric conversion unit. Even if the current corresponding to the first photoelectric conversion signal with a certain gain does not exceed the range of current values capable of AD conversion, the current corresponding to the second photoelectric conversion signal with the substantially same gain may exceed the range of current values capable of AD conversion. Increasing the gain when the first photoelectric conversion signal is read and reducing the gain when the second photoelectric conversion signal is read lead to improvements in the AF precision while the signals are prevented from exceeding the range of current values capable of AD conversion. According to the present exemplary embodiment, the plurality of photoelectric conversion signals is read with respective different gains, and in the operation, the AF precision is improved while the signals is prevented from exceeding the range of current values capable of AD conversion.

In FIG. 7, the photoelectric conversion units 400 and 401 may have different areas. A photoelectric conversion unit of larger area and a photoelectric conversion unit of smaller area store different amounts of charge. In other words, the photoelectric conversion unit of larger area and the photoelectric conversion unit of smaller area generate different amounts of charge for the light incident in the same period. The photoelectric conversion units 400 and 401 thus output signals with different ranges of output amplitudes.

In FIG. 7, the pixel 10 may further include an FD capacitance switching transistor 456, and read pixel signals with different voltage conversion gains by switching the FD capacitance switching transistor 456 on and off during the pixel signal reading period. Even in such a case, the photoelectric conversion units 400 and 401 output signals with respective different ranges of output amplitudes. This is achieved due to a difference in the thresholds of the reset transistor 455 and the FD capacitance switching transistor 456, for example. In a case where the reset-transistor 455 has a relatively high threshold, the range of output amplitude of the pixel signal with the lower voltage conversion gain increases with the FD capacitance switching transistor 456 on. The reason is that the voltage of the FD portion 420 drops from the reset level to an even lower level.

Figure 9A:
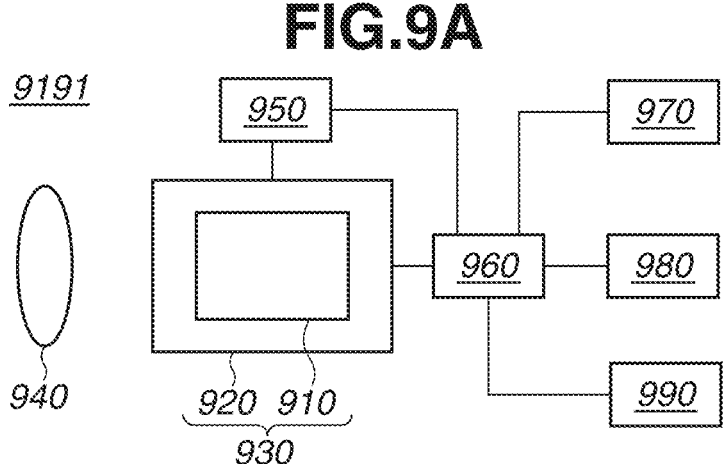
FIGS. 9A to 9C are schematic diagrams for describing devices according to a third exemplary embodiment.

A third exemplary embodiment is applicable to both the first exemplary embodiment and the second exemplary embodiment. FIG. 9A is a schematic diagram illustrating a device 9191 including a semiconductor apparatus 930 according to the present exemplary embodiment. As the semiconductor apparatus 930, the photoelectric conversion apparatus (imaging apparatus) according to each of the above-described exemplary embodiments is usable. The device 9191 including the semiconductor apparatus 930 will be described in detail. The semiconductor apparatus 930 includes a semiconductor device 910. In addition to the semiconductor device 910, the semiconductor apparatus 930 may include a package 920 storing the semiconductor device 910. The package 920 includes a base member on which the semiconductor device 910 is fixed, and a lid member, such as glass facing the semiconductor device 910. The package 920 may further include a bonding member, such as a bonding wire or a bump that connects a terminal disposed in the base member and a terminal disposed in the semiconductor device 910.

The device 9191 includes at least any of an optical device 940, a control device 950, a processing device 960, a display device 970, a storage device 980, and a mechanical device 990. The optical device 940 supports for the semiconductor apparatus 930. The optical device 940 is a lens, a shutter, or a mirror, for example, and includes an optical system for guiding light to the semiconductor apparatus 930. The control device 950 controls the semiconductor apparatus 930. The control device 950 is a semiconductor apparatus, such as an ASIC, for example.

The processing device 960 processes a signal output from the semiconductor apparatus 930. The processing device 960 is a semiconductor apparatus, such as a CPU or an ASIC, for forming an analog front end (AFE) or a digital front end (DFE). The display device 970 is an electroluminescent (EL) display device or a liquid crystal display device that displays information (image) obtained in the semiconductor apparatus 930. The storage device 980 is a magnetic device or a semiconductor device that stores information (image) obtained in the semiconductor apparatus 930. The storage device 980 is a volatile memory, such as a static RAM (SRAM) or a dynamic RAM (DRAM), or a nonvolatile memory, such as a flash memory or a hard disk drive.

The mechanical device 990 includes a moving unit or a propulsion unit, such as a motor or an engine. In the device 9191, a signal output from the semiconductor apparatus 930 is displayed on the display device 970 and transmitted to the outside by a communication device (not illustrated) included in the device 9191. In this configuration, the device 9191 further includes the storage device 980 and the processing device 960 aside from a storage circuit and a calculation circuit included in the semiconductor apparatus 930. The mechanical device 990 may be controlled based on a signal output from the semiconductor apparatus 930.

The device 9191 is suitable for an electronic device, such as an information terminal having an image capturing function (e.g., smartphone or wearable terminal) or a camera (e.g., interchangeable lens camera, compact camera, video camera, monitoring camera). The mechanical device 990 in a camera drives a component of the optical device 940 for zooming, focusing, or a shutter operation. Alternatively, the mechanical device 990 in a camera moves the semiconductor apparatus 930 for an image stabilization operation.

Examples of the device 9191 include a transport device, such as a vehicle, a ship, or a flight vehicle (drone, airplane, etc.). The mechanical device 990 in a transport device may be used as a moving device. The device 9191 serving as a transport device is suitable for a device that transports the semiconductor apparatus 930, or a device that aids and/or automates driving (steering) using an image capturing function. The processing device 960 for aiding and/or automating driving (steering) performs processing to operate the mechanical device 990 serving as a moving device, based on information obtained in the semiconductor apparatus 930. Alternatively, the device 9191 may be a medical device, such as an endoscope, a measuring device, such as a distance measuring sensor, an analytical device, such as an electronic microscope, an office device, such as a copier, or an industrial device, such as a robot.

According to the above-described exemplary embodiment, pixel characteristics are obtainable. This leads to enhancement of the value of the semiconductor apparatus. The enhancement of the value corresponds to at least any of the addition of a function, performance improvement, characteristic improvement, reliability improvement, manufacturing yield ratio improvement, environmental burden reduction, cost reduction, downsizing, and weight saving.

Consequently, using the semiconductor apparatus 930 according to the present exemplary embodiment in the device 9191 also leads to enhancement of the value of the device 9191. For example, a transport device on which the semiconductor apparatus 930 is mounted achieves superior performance in the image capturing the outside of the transport device or measuring an external environment. Thus, determining to mount the semiconductor apparatus according to the present exemplary embodiment on a transport device when manufacturing and selling the transport device is advantageous in improving the performance of the transport device itself. The semiconductor apparatus 930 is suitable especially for a transport device that performs drive assist and/or automatic operation of the transport device using information obtained in the semiconductor apparatus 930.

A photoelectric conversion system and a movable body according to the present exemplary embodiment will be described with reference to FIGS. 9B and 9C.

Figure 9B:
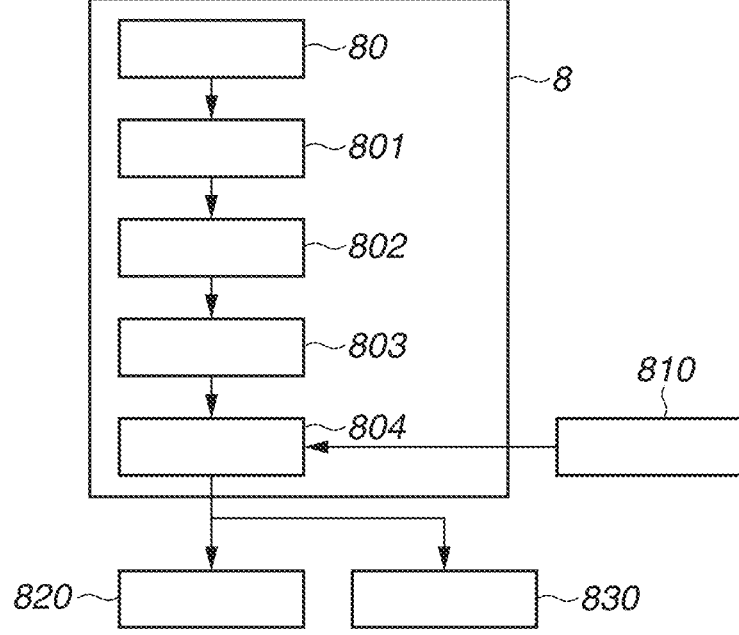

FIG. 9B illustrates an example of a photoelectric conversion system related to an in-vehicle camera. A photoelectric conversion system 8 includes a photoelectric conversion apparatus 80. The photoelectric conversion apparatus 80 is the photoelectric conversion apparatus (imaging apparatus) according to any of the above-described exemplary embodiments. The photoelectric conversion system 8 includes an image processing unit 801 that performs image processing on a plurality of pieces of image data acquired by the photoelectric conversion apparatus 80, and a parallax acquisition unit 802 that calculates a parallax (phase difference between parallax images) from the plurality of pieces of image data acquired by the photoelectric conversion system 8. Here, the photoelectric conversion system 8 may include an optical system (not illustrated), such as a lens, a shutter, or a mirror that guides light to the photoelectric conversion apparatus 80. A plurality of photoelectric conversion units approximately equivalent to a pupil of the optical system may be disposed in pixels included in photoelectric conversion apparatus 80. For example, the plurality of photoelectric conversion units approximately equivalent to the pupil are disposed in such a manner as to correspond to one microlens. By the plurality of photoelectric conversion units receiving light beams having passed through mutually-different position of the pupil of the optical system, the photoelectric conversion apparatus 80 outputs image data corresponding to the light beams having passed through the different position. Then, the parallax acquisition unit 802 may calculate a parallax using the output image data. The photoelectric conversion system 8 further includes a distance acquisition unit 803 that calculates a distance to a target object based on the calculated parallax, and a collision determination unit 804 that determines whether collision is likely to occur, based on the calculated distance. In the present exemplary embodiment, the parallax acquisition unit 802 and the distance acquisition unit 803 serve as an example of a distance information acquisition unit that acquires distance information regarding a distance to a target object. More specifically, the distance information is information regarding a parallax, a defocus amount, and a distance to a target object. The collision determination unit 804 may determine collision likelihood using any of these pieces of distance information. The distance information may be acquired using a Time-of-Flight (ToF) technique. The distance information acquisition unit may be implemented by dedicatedly-designed hardware, or may be implemented by a software module. The distance information acquisition unit may be implemented by a FPGA) or an ASIC, or may be implemented by the combination of these.

The photoelectric conversion system 8 is connected to a vehicle information acquisition apparatus 810, and acquires vehicle information, such as vehicle speed, a yaw rate, or a rudder angle. An electronic control unit (ECU) 820 is connected to the photoelectric conversion system 8. The ECU 820 serves as a control apparatus that outputs a control signal to cause a vehicle to generate braking force, based on a determination result obtained by the collision determination unit 804. The photoelectric conversion system 8 is also connected to an alarm apparatus 830 that raises an alarm to a driver, based on a determination result obtained by the collision determination unit 804. For example, in a case where the determination result obtained by the collision determination unit 804 indicates high collision likelihood, the control ECU 820 performs vehicle control to avoid collision or reduce damages by braking, releasing an accelerator, or suppressing engine output. The alarm apparatus 830 issues an alarm to a user by sounding an alarm such as sound, displaying warning information on a screen of a car navigation system, or vibrating a seatbelt or a steering wheel.

In the present exemplary embodiment, the photoelectric conversion system 8 captures an image of the periphery of the vehicle, such as the forward image or the backward image, for example.

Figure 9C:
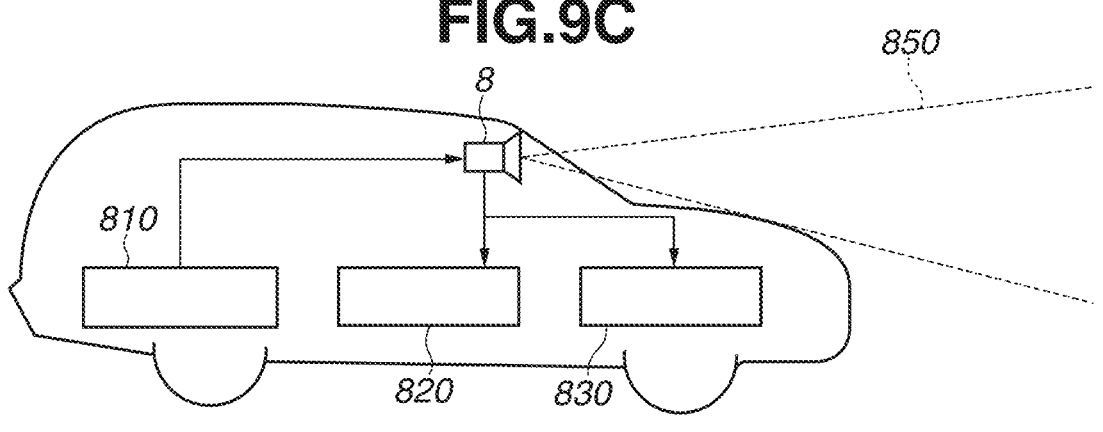

FIG. 9C illustrates a photoelectric conversion system for capturing a forward image of a vehicle (imaging range 850). The vehicle information acquisition apparatus 810 issues an instruction to the photoelectric conversion system 8 or the photoelectric conversion apparatus 80. With this configuration, the accuracy of distance measurement is further enhanced.

The above description has been given of an example in which control is performed to avoid a collision with another vehicle. The photoelectric conversion system is also applicable to control for autonomous driving to follow another vehicle, or control for autonomous driving to avoid a deviation from a lane. Furthermore, the photoelectric conversion system 8 is applicable not only to a vehicle, such as an automobile, but also to a mobile body (movable apparatus) such as a vessel, an aircraft, or an industrial robot. Moreover, the photoelectric conversion system may be employed in a device extensively using object recognition, such as an intelligent transport system (ITS), in addition to a movable body.

As used herein, expressions such as "A or B", "at least one of A and B", "at least one of A or/and B", "one or more of A or/and B", and the like encompass all possible combinations of the listed items, unless expressly defined otherwise. That is, the above expression is understood to disclose all of the following cases: when at least one A is included, when at least one B is included, and when both at least one A and at least one B are included. This applies equally to combinations of three or more elements.

The exemplary embodiments described above can be appropriately modified without departing from the technical idea. The disclosure of the present specification includes not only the matters described in the present specification but also all matters that can be grasped from the present specification and the drawings attached to the present specification. The disclosure also includes the complement of the concepts described herein. That is, for example, when the description "A is larger than B" is given in the present specification, even if the description "A is not larger than B" is omitted, it can be said that the present specification discloses "A is not larger than B". This is because, when "A is larger than B" is described, the description is based on the premise that "A is not larger than B".

According to an exemplary embodiment of the disclosure, noise or power consumption can be reduced in reading signals from pixels.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-208257, filed Dec. 11, 2023, which is hereby incorporated by reference herein in its entirety.

What is claimed is:

1. A photoelectric conversion apparatus comprising:
   a pixel including a photoelectric conversion unit configured to accumulate a charge based on incident light, the pixel being configured to output a photoelectric conversion signal based on the accumulated charge;
   a sample-and-hold unit configured to sample and hold a first photoelectric conversion signal and a second photoelectric conversion signal output from the pixel; and
   an oversampling conversion unit configured to analog-to-digital (AD) convert the first photoelectric conversion signal and the second photoelectric conversion signal output from the sample-and-hold unit,
   wherein in processing from when the first photoelectric conversion signal and the second photoelectric conversion signal are output from the pixel to when the first photoelectric conversion signal and the second photoelectric conversion signal are AD converted, a gain set for the first photoelectric conversion signal and a gain set for the second photoelectric conversion signal are different.

2. The photoelectric conversion apparatus according to claim 1, wherein the first photoelectric conversion signal and the second photoelectric conversion signal have different ranges of output amplitudes.

3. The photoelectric conversion apparatus according to claim 2, wherein the range of output amplitude of the first photoelectric conversion signal is narrower than the range of the second photoelectric conversion signal, and the gain set for the first photoelectric conversion signal is higher than the gain set for the second photoelectric conversion signal.

4. The photoelectric conversion apparatus according to claim 1, wherein the photoelectric conversion unit is configured to accumulate the charge for different durations, and the duration to accumulate the charge corresponding to the first photoelectric conversion signal and the duration to accumulate the charge corresponding to the second photoelectric conversion signal are different from each other.

5. The photoelectric conversion apparatus according to claim 4,
   wherein the duration to accumulate the charge corresponding to the first photoelectric conversion signal is shorter than the duration to accumulate the charge corresponding to the second photoelectric conversion signal, and
   wherein the gain set for the first photoelectric conversion signal is higher than the gain set for the second photoelectric conversion signal.

6. The photoelectric conversion apparatus according to claim 1, wherein the conversion unit is configured to AD convert respective differences of the first and second photoelectric conversion signals from a reset-level signal of the photoelectric conversion unit.

7. The photoelectric conversion apparatus according to claim 6, wherein the sample-and-hold unit includes a first sample-and-hold circuit configured to sample and hold the reset-level signal and a second sample-and-hold circuit configured to sample and hold each of the first and second photoelectric conversion signals.

8. The photoelectric conversion apparatus according to claim 7, wherein the first and second photoelectric conversion signals are held in two respective capacitors included in the second sample-and-hold circuit.

9. The photoelectric conversion apparatus according to claim 6, wherein the reset-level signal includes a first reset-level signal corresponding to the first photoelectric conversion signal and a second reset-level signal corresponding to the second photoelectric conversion signal, and a gain set for the first reset-level signal and a gain set for the second reset-level signal are different from each other.

10. The photoelectric conversion apparatus according to claim 1, wherein the sample-and-hold unit includes an inverting amplifier, and the first and second photoelectric conversion signals are output via the inverting amplifier.

11. The photoelectric conversion apparatus according to claim 1, further comprising:
   a gain setting unit configured to set the gain,
   wherein the gain setting unit is configured to separately set the gain for the first photoelectric conversion signal and the gain for the second photoelectric conversion signal.

12. The photoelectric conversion apparatus according to claim 11, wherein the gain setting unit is electrically connected between respective output nodes of a plurality of sample-and-hold circuits included in the sample-and-hold circuit.

13. The photoelectric conversion apparatus according to claim 11,
   wherein the gain setting unit includes a variable resistance circuit, and
   wherein the gain for the first photoelectric conversion signal and the gain for the second photoelectric conversion signal are separately set by changing a resistance of the variable resistance circuit.

14. The photoelectric conversion apparatus according to claim 1,
   wherein the pixel includes a floating diffusion portion to which the charge is input, and a floating diffusion capacitance switching unit configured to switch a capacitance of the floating diffusion portion, and
   wherein when the pixel outputs the first photoelectric conversion signal and the second photoelectric conversion signal, the respective capacitance of the floating diffusion unit is switched.

15. The photoelectric conversion apparatus according to claim 1,
   wherein the pixel includes a plurality of photoelectric conversion units, and
   wherein the first photoelectric conversion signal is a photoelectric conversion signal output from one of the plurality of photoelectric conversion units, and the second photoelectric conversion signal is a photoelectric conversion signal output from the other of the plurality of photoelectric conversion units.

16. The photoelectric conversion apparatus according to claim 1,
   wherein the pixel includes a plurality of photoelectric conversion units, and
   wherein the first photoelectric conversion signal is a photoelectric conversion signal output from one of the plurality of photoelectric conversion units, and the second photoelectric conversion signal is a photoelectric conversion signal output from the plurality of photoelectric conversion units.

17. The photoelectric conversion apparatus according to claim 16, wherein a microlens is disposed to correspond to the pixel, and the plurality of photoelectric conversion units is disposed to correspond to the microlens.

18. The photoelectric conversion apparatus according to claim 16, wherein the plurality of photoelectric conversion units is configured to generate different amounts of charge for light incident in a same period.

19. The photoelectric conversion apparatus according to claim 16, wherein a plurality of pixels is arranged in a row direction and a column direction, and the plurality of photoelectric conversion units is arranged in the column direction.

20. A device comprising:

the photoelectric conversion apparatus according to claim 1; and at least one of the following:

an optical apparatus configured to guide light to the photoelectric conversion apparatus, a control apparatus configured to control the photoelectric conversion apparatus, a processing apparatus configured to process a signal output from the photoelectric conversion apparatus, a display apparatus configured to display information obtained by the photoelectric conversion apparatus, a storage apparatus configured to store the information obtained by the photoelectric conversion apparatus, and a mechanical apparatus configured to operate based on the information obtained by the photoelectric conversion apparatus.

* * * * *